(12) United States Patent
Torres

(10) Patent No.: US 8,821,721 B2
(45) Date of Patent: Sep. 2, 2014

(54) OIL RECOVERY BOOM

(76) Inventor: Luis Rafael Torres, Chula Vista, CA (US)

( * ) Notice: Subject to any disclaimer, the term of this patent is extended or adjusted under 35 U.S.C. 154(b) by 330 days.

(21) Appl. No.: 13/245,671

(22) Filed: Sep. 26, 2011

(65) Prior Publication Data

US 2012/0145614 A1 Jun. 14, 2012

Related U.S. Application Data

(60) Provisional application No. 61/386,485, filed on Sep. 28, 2010.

(51) Int. Cl.
- *E02B 15/10* (2006.01)
- *E02B 15/06* (2006.01)
- *E02B 15/04* (2006.01)
- *C02F 103/00* (2006.01)

(52) U.S. Cl.
CPC .............. *E02B 15/06* (2013.01); *E02B 15/047* (2013.01); *E02B 15/106* (2013.01); *E02B 15/108* (2013.01); *C02F 2103/007* (2013.01); *Y10S 210/923* (2013.01)
USPC .............. 210/170.05; 210/170.11; 210/242.3; 210/923; 405/63

(58) Field of Classification Search
CPC ....... E02B 15/047; E02B 15/06; E02B 15/08; E02B 15/10; E02B 15/106; E02B 15/108; C02F 2103/007
USPC .............. 210/170.05, 170.09, 170.11, 242.3, 210/747.6, 776, 923; 405/60, 63
See application file for complete search history.

(56) References Cited

U.S. PATENT DOCUMENTS

| | | | | | |
|---|---|---|---|---|---|
| 3,221,884 | A | * | 12/1965 | Muller ........................ | 210/242.3 |
| 3,369,664 | A | * | 2/1968 | Dahan ........................... | 210/923 |
| 3,565,254 | A | * | 2/1971 | Latimer ................... | 210/170.05 |
| 3,666,098 | A | * | 5/1972 | Garland et al. ............ | 210/242.3 |
| 3,847,816 | A | * | 11/1974 | DiPerna ..................... | 210/242.3 |
| 5,071,545 | A | * | 12/1991 | Ashtary ..................... | 210/242.3 |
| 5,160,432 | A | * | 11/1992 | Gattuso ...................... | 210/242.3 |
| 5,169,526 | A | * | 12/1992 | Gould ........................ | 210/242.3 |
| 5,292,433 | A | * | 3/1994 | Fletcher et al. ........... | 210/170.05 |
| 6,663,772 | B2 | * | 12/2003 | Rosquist .................... | 210/242.3 |
| 7,326,354 | B2 | * | 2/2008 | Ferreira .................... | 210/170.11 |

* cited by examiner

*Primary Examiner* — Christopher Upton
(74) *Attorney, Agent, or Firm* — Gary L. Eastman, Esq.

(57) ABSTRACT

The oil recovery boom of the present invention is designed to collect great amounts of oil if used in conjunction with many other booms. The oil recovery boom includes a set of eductors, and removes the adjacent oil for extraction from the sea. A high pressure pump placed at one end of the boom takes water from the sea and pumps it through a flexible manifold. The manifold in turn provides water pressure to each eductor and, the oil carried with the water is then pumped into a barge or containment with overflow sections, which will then separate the oil from the water for later processing. Embodiments of the present invention adopts an array of eductors which can be positioned either in series or in parallel. The oil recovery boom of the present invention provides for the immediate and large-scale removal of oil from the sea.

20 Claims, 7 Drawing Sheets

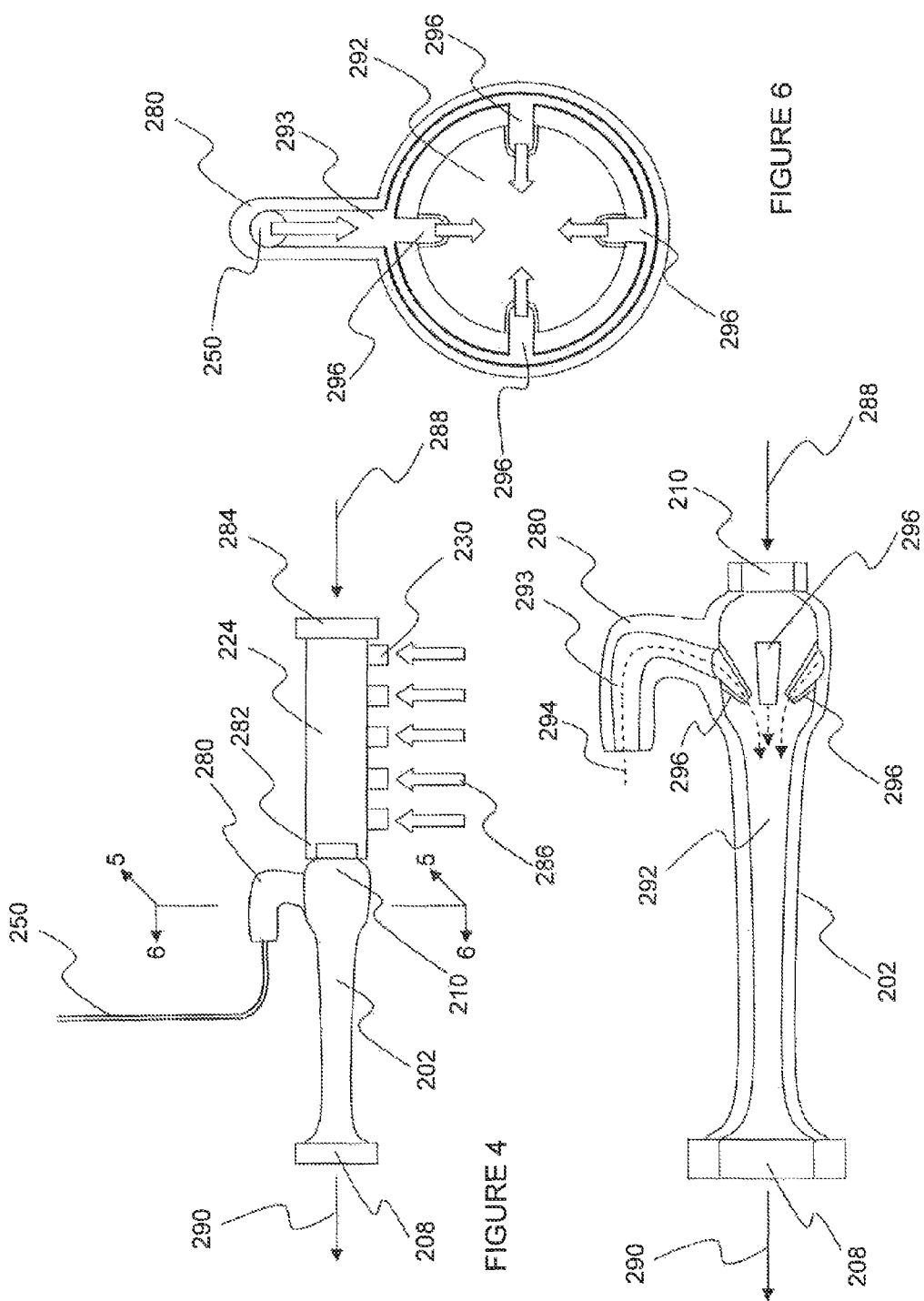

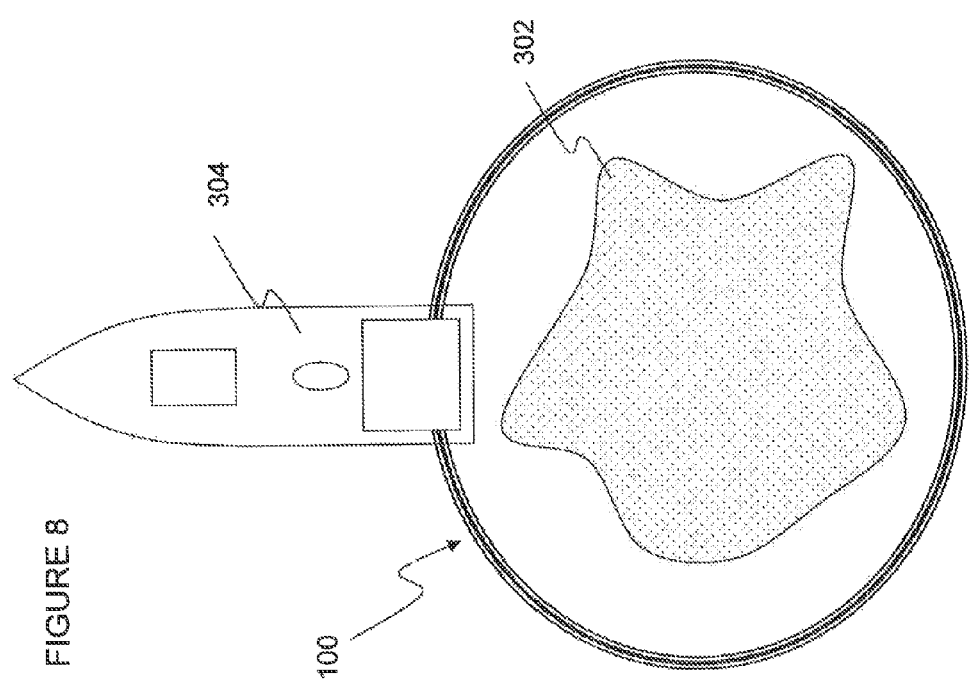

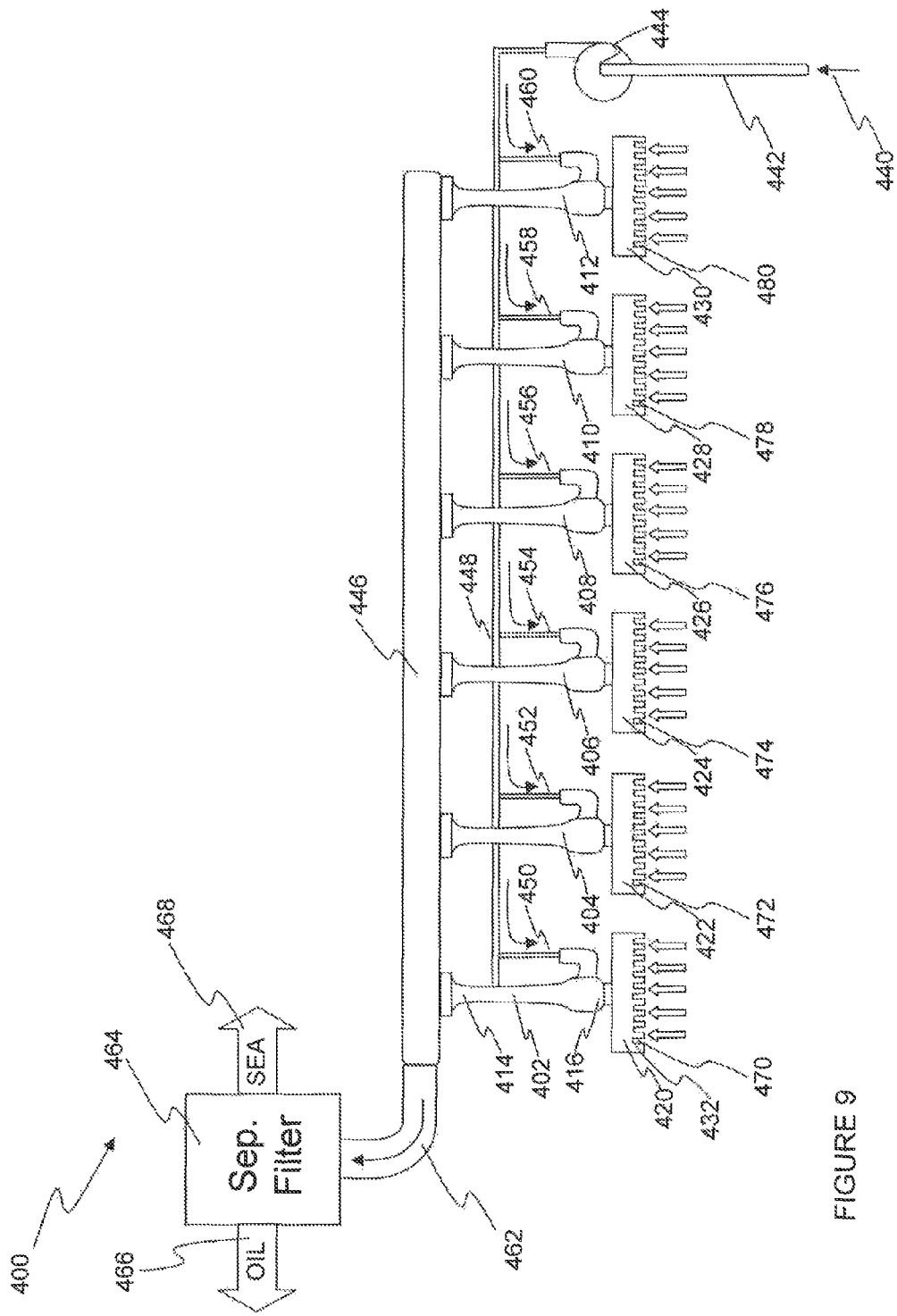

OIL RECOVERY BOOM

CROSS REFERENCE TO RELATED APPLICATION

This application claims priority to and the benefit of the United States Provisional Patent Application for "Oil Recovery Boom," Ser. No. 61/386,485, filed on Sep. 25, 2010, and the disclosure is incorporated fully herein by reference.

BACKGROUND OF THE INVENTION

1. Field of the Invention

The present invention relates generally to an oil recovery boom and more specifically to an immediate and large-scale removal system of oil from the sea. The present invention is more particularly, though not exclusively useful as multiple oil recovery booms can be used simultaneously in order to attack widespread oil presence.

2. Description of the Related Art

Over the past century, crude oil has become the lifeblood of many economies. As the need for crude oil increases, it is becoming increasingly difficult to locate reserves of crude oil, and remove that oil both efficiently, and safely. It is common for crude oil reserves to be located beneath the sea. These reserves can often be very large volumes of oil at extraordinarily high pressures. Since the first submerged oil well was drilled in 1891, several oil platform designs have been implemented. One oil rig standard common today is to utilize floating oil rigs to drill into the sea bed and into the oil volume. Floating oil rigs are anchored to the sea floor, but the oil rig floats on the surface of the ocean. The changing seas, and natural ocean currents, result in movement of the oil rig. Nevertheless, techniques have been developed to safely remove oil from the ocean and into pipelines or oil tanker ships to transport the crude oil for refining.

Oil rigs, when utilized properly and safely, can be very efficient at removing the oil from the seabed. However, because many oil reserves are located several thousand feet below the surface of the sea, it can be risky to drill on moving platforms. Thus, while the safety of oil rigs is high, there will nevertheless be an occasional accident that results in the presence of crude oil in the sea.

The sea is a very delicate environment, and the introduction of large volumes of crude oil can quickly devastate an entire ecosystem. Thus, when an accident does occur, it is imperative that any oil present in the sea be removed immediately. The oil can quickly dissipate throughout the region of the sea, and quickly harm or destroy the regional fish, wildlife and coastline unless steps are taken immediately to remove the leaked oil.

The oil recovery boom of the present invention provides for the immediate and large-scale removal of oil from the sea. The present invention is scalable and can be reproduced and multiple oil recovery booms can be used simultaneously in order to attack widespread oil presence.

SUMMARY OF THE INVENTION

The oil recovery boom of the present invention is designed to collect great amounts of oil equal to or greater than the amount of oil being spilled if used in conjunction with many other booms. The oil recovery boom includes a set of eductors constructed as part of an inner boom and floats on the surface of the sea through a series of suction ports, or receivers, and removes the adjacent oil for extraction from the sea. A high pressure pump placed at one end of the boom takes water from the sea and pumps it through a flexible manifold, which is part of the boom and which is fixed inside or outside of the boom. The manifold in turn provides water pressure to each eductor thus creating suction at each eductor. The oil carried with the water is then pumped into a barge or containment with overflow sections, which will then separate the oil from the water for later processing.

The inner eductor boom can be designed with eductors four to six feet apart attached by flexible hoses for flexibility and ease of maneuverability of the boom. The water manifold would stick out of the suction end of the boom and the siphon tubes would protrude out of the side of the boom. The final eductor discharge connection would protrude out of the discharge end of the boom for connection to hose or pipe leading to oil containment.

For these purposes, embodiments of the present invention adopts an array of eductors which can be positioned either in series or in parallel. A water source is connected to inlet leading to a high pressure pump and the pump creates a high pressure water supply that is provided to manifold which is distributed through supply lines to eductors, respectively. The high pressure water provided through supply lines creates a vacuum at the inlet of each eductor which in turn creates a vacuum at adjacent connecting tubes and such that fluids are drawn into inlets, pulling the contaminated water with it. Through the separation filter, the oil is collected and cleaned seawater is finally returned to the sea.

The oil recovery boom of the present invention provides for the immediate and large-scale removal of oil from the sea. The present invention is scalable and can be reproduced and multiple oil recovery booms can be used simultaneously in order to attack widespread oil presence. In addition, the system of the present invention may be implemented into a vessel where a circular boom may be utilized to contain and remove a localized contaminate.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein:

FIG. 4 is a side view of a portion of the oil recovery boom of the present invention showing a single eductor coupled to a single receiver, with the eductor receiving pressurized water to create the vacuum within thereby drawing a vacuum within the receiver which is positioned to receive contaminated water from the sea;

FIG. 5 is a side cross-sectional view of the eductor of the oil recovery boom of the present invention and showing the placement of the water jets within the central chamber of the eductor and creating a vacuum at the inlet side of the eductor to draw water into and through the eductor;

FIG. 6 is a longitudinal cross-sectional drawing taken along line 6-6 of FIG. 5, and showing the placement of eductor jets within the central bore of the eductor to create the forward flow of fluid which results in a vacuum being created within the receiver (not shown this Figure);

FIG. 8 depicts another configuration in which the system of the present invention may be to make a continuous loop with the boom to contain and remove a localized contaminate.

FIG. 9 illustrates a detailed schematic drawing of an alternative embodiment of the present invention showing an array of eductors which is attached to receivers of connecting tubes and connected in parallel, to form an oil recovery boom of the present invention and the system separation filter to separate the oil from the sea water.

DETAILED DESCRIPTION OF THE INVENTION

Figure 1:
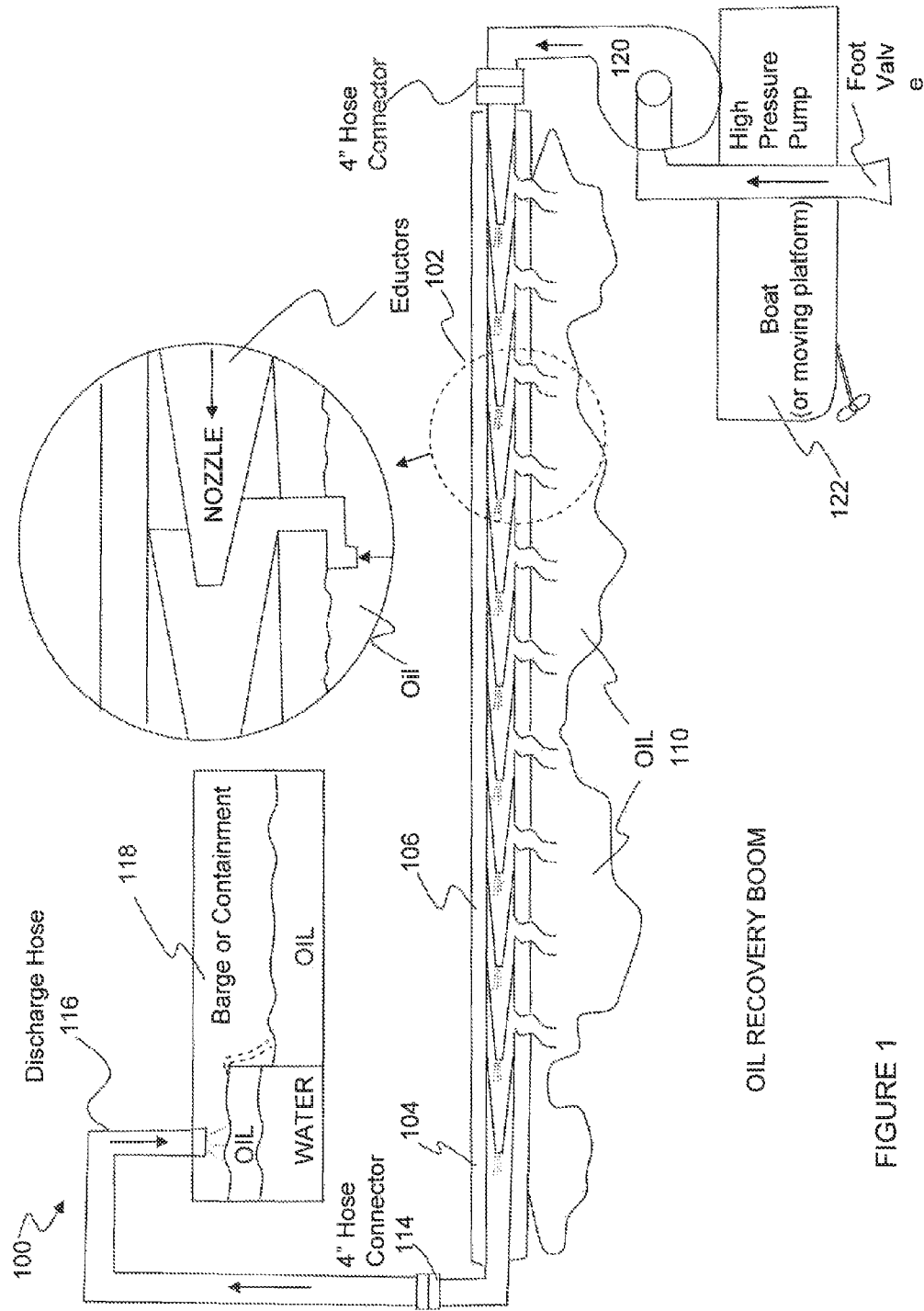
FIG. 1 is a schematic drawing of the oil recovery boom of the present invention showing the placement of sequential eductors positioned to extract surface fluids from a contaminated sea for extraction and separation of the oil contaminates, and return of cleaned seawater to the sea.

Referring to FIG. 1, the Oil Recovery Boom of the present invention is generally designed 100, and designed to collect great amounts of oil equal to or greater than the amount of oil being spilled if used in conjunction with many other booms. Specifically, the oil recovery boom floats on the surface of the sea adjacent oil and through a series of suction ports, or receivers, and removes the adjacent oil for extraction from the sea.

The Oil Recover Boom includes a set of eductors constructed as part of an inner boom. A high pressure pump (100-150 psi) placed at one end of the boom (not part of the boom) takes water from the sea and pumps it through a flexible manifold, which is part of the boom and which is fixed inside or outside of the boom. The manifold in turn provides water pressure to each eductor thus creating suction at each eductor. One boom with a multiple of eductors will siphon oil and water in very great quantities. The oil carried with the water is then pumped into a barge or containment (not part of the boom) with overflow sections, which will then separate the oil from the water for later processing. The design of this boom employs various tasks; the outer boom keeps the oil at bay during siphoning operation, the eductors in the inner boom siphon oil and water very rapidly, and the multiple eductor design helps to siphon in very great quantities. Booms can be extended the length of an oil spill, or placed in a circle around or within an oil spill for rapid collection of the oil.

The inner Eductor Boom can be designed with eductors four to six feet apart attached by flexible hoses for flexibility and ease of maneuverability of the boom. Eductors should be similar to the Perijet design and of 4" size and made of PVC or other light but strong material to minimize weight. Since the opening of the eductor design similar to the Perijet can allow for objects up to 2½" in size to pass through it, clogging should not be an issue. The high pressure water manifold, which is fixed inside or outside the boom, can be a fire hose or some other strong flexible hose.

The boom can be designed such that it can be zipped open for insertion of eductor assembly and water manifold and then zipped closed. The water manifold would stick out of the suction end of the boom. The siphon tubes would protrude out of the side of the boom. The final eductor discharge connection would protrude out of the discharge end of the boom for connection to hose or pipe leading to oil containment.

The following is a brief description of a Perijet design eductor: With a 4" eductor activated at 100 psi water pressure, 182 gallons per minute of water is required for operation of the eductor. Working against a head of 40 ft for example, the eductor will discharge a total of 333 gallons per minute. This amount includes the 182 gpm that is being used to activate the eductor. Therefore the net discharge of the eductor is 333 minus 182, or 151 gpm pumping rate. When using an eductor, operating pressure should be higher than the pressure the eductor is required to discharge against. A simple rule to follow is the operating pressure should be at least three times the static head. Or multiply the discharge head in feet by 0.433, which is the weight of a column of water 1" square and 1 ft high. Multiply the answer by 3 to obtain the pressure required. Example: Eductor must discharge against 50 ft static head, 50*0.433=21.65 psi. Multiply 21.65 by 3=65.95 psi. This is the minimum pressure required to be able to discharge against a 50 ft static head. Therefore a supply pressure to the boom of 150 psi or greater with eductors working in parallel would make for an efficient oil recovery boom design.

This boom can be deployed to all areas where oil gathers including marshes. And it is a simple design that if expedited could be constructed and deployed in a very short amount of time for the cleanup of the current oil spill.

Referring initially to FIG. 1, a schematic drawing of the oil recovery boom of the present invention is generally designated 100. As shown, boom 100 includes an array of sequential eductors 102 within an inner eductor boom 104. The inner eductor boom is contained within an outer eductor boom 106 which maintains the placement of the eductors 102 positioned to extract surface fluids, such as oil 110, from a contaminated sea for extraction and separation of the oil contaminates. Fluid is drawn into the eductors 102 and along inner eductor boom. Through hose connector 114 to a discharge hose or pipe 116, which is deposited into a barge or containment 118 where the oil and water are separated. The oil is removed, and the cleaned seawater is returned to the sea. A high pressure pump 120 provides pressurized water to eductors 102. In a preferred embodiment, the high pressure pump 120 may be located on a boat or moving platform 122.

Figure 2:
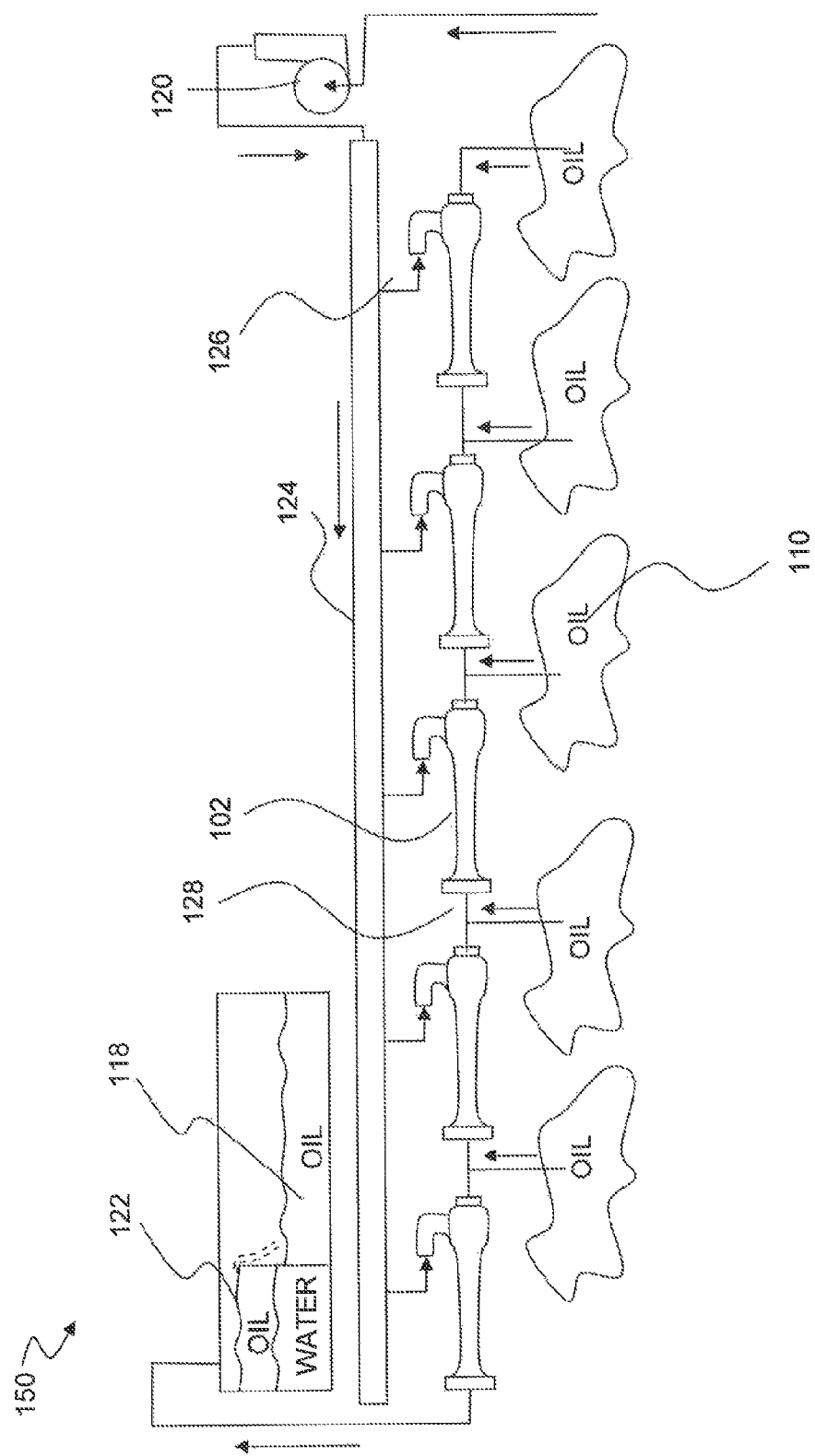
FIG. 2 is a system level schematic drawing of the oil recovery boom of the present invention depicting a series of eductors receiving pressurized water to create the vacuum necessary for the extraction of oil-contaminated fluids though receivers from the sea.

Referring now to FIG. 2, an alternative embodiment of the system of the oil recovery boom of the present invention is shown and generally designated 150. System 150 includes an array of eductors 102 which are interconnected through connecting tubes 128. As will be discussed in greater detail below, connecting tubes 128 are formed with oil-receiving ports which draw oil-contaminated water into the connecting tubes for extraction through the eductors 102.

High pressure pump 120 provides a high pressure water supply to a high pressure manifold 124. Supply lines 126 lead from manifold 124 to eductors 102. As shown, high pressure pump 120 provides the high pressure water to eductors 102 such that oil 110 is drawn into connecting tubes 128, and to oil containment device 118. The oil containment removes the oil or other contaminate from the sea water, returning the cleaned sea water to the sea.

Figure 3:
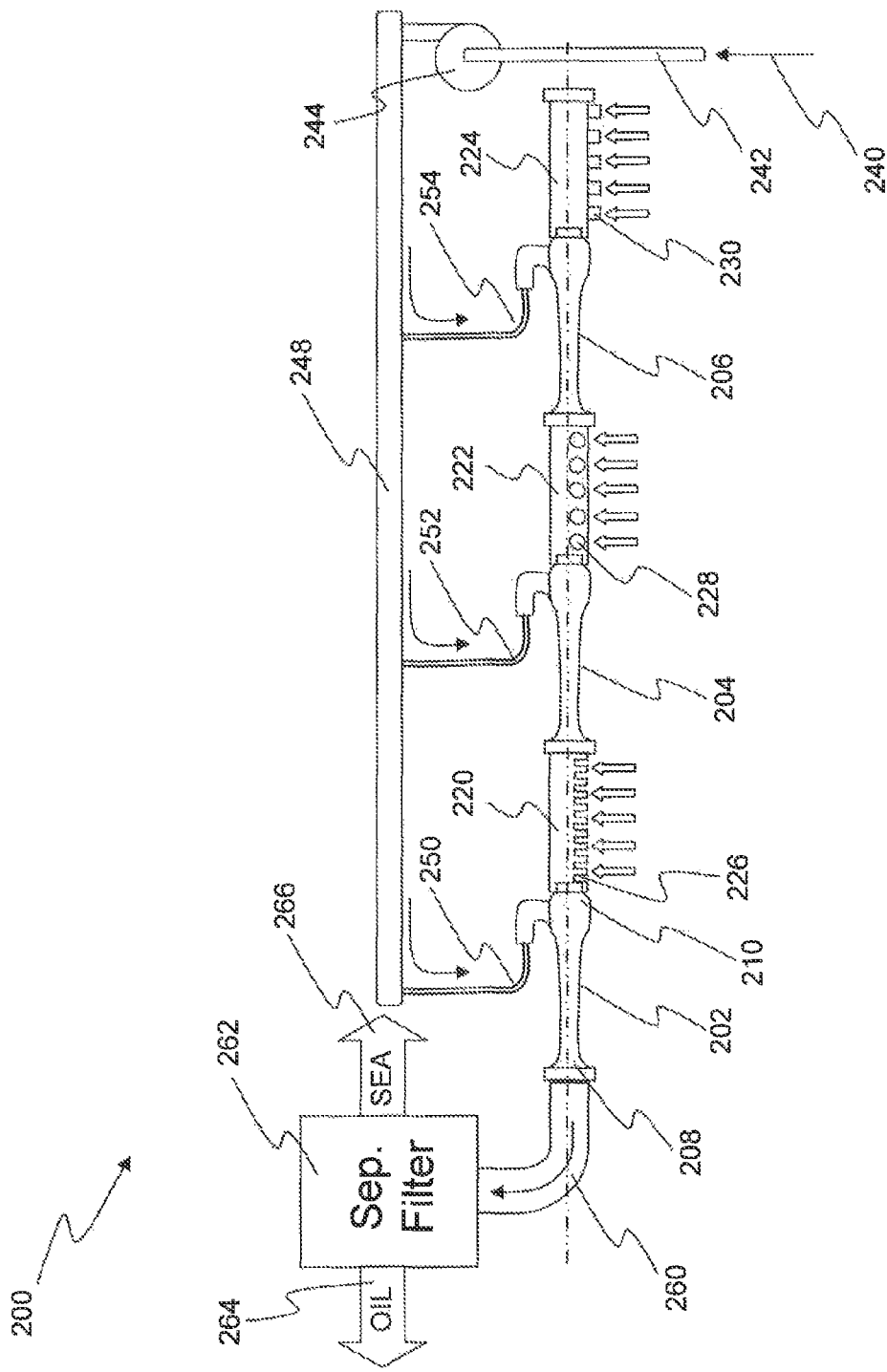
FIG. 3 is a detailed schematic drawing showing a series of eductors separated by receivers having different configurations demonstrating the various embodiments of the oil recovery boom of the present invention and the system separation filter to separate the oil from the sea water.

Referring to FIG. 3, a detailed schematic drawing of the oil recovery boom of the present invention is shown and generally designated 200. An array of eductors 202, 204 and 206 are positioned to form a boom. Each eductor has an inlet 210 and an outlet 208. Connecting tubes 220, 222 and 224 separate eductors 202, 204, and 206. As shown, each connecting tube is formed with a different inlet port. For instance, connecting tube 222 is formed with a longitudinal array of slits 226 which allow seawater to enter into the connecting tube from an area of normal pressure, to a vacuum area creating a lower pressure region within the boom. Similarly, connecting tube 222 is formed with a number of inlet holes 228, and connecting tube 224 is formed with a number of inlet tubes 230. What is to be appreciated is that the specific shape and form of the connecting tubes is not limiting on the system of the present invention, and what has been shown are merely examples of preferred embodiments of the present invention.

In use, a water source, such as seawater 240 is connected to inlet 242 leads to a high pressure pump 244. Pump 244 creates a high pressure water supply that is provided to manifold 248, which is distributed through supply lines 250, 252 and 254 to eductors 202, 204 and 206, respectively. In operation, the high pressure water provided through supply lines 250, 252 and 254 creates a vacuum at the inlet 210 of each eductor which in turn creates a vacuum at adjacent connecting tubes 220, 222, and 224 such that fluids are drawn into inlets 226, 228 and 230, pulling the contaminated water with it.

Once within the eductor, the contaminated fluids are advanced in direction 260 to separation filter 262 which separates oil 264 from seawater 266. The oil 264 is collected, and the now-cleaned seawater 266 is returned to the sea.

As shown in FIG. 3, three eductors 220, 222 and 224 have been included to discuss the overall operation of the system of the present invention. It is to be appreciated, however, that the number of eductors may range from one to many, depending on the length of the boom, the pressure provided by pump 244, and the size and number of inlets 226, 228 and 230.

FIG. 4 provides a side view of a portion of the oil recovery boom of the present invention showing a single eductor 202 coupled to a single connecting tube 224, or receiver. The eductor 202 receives pressurized water from supply 250 through jacket 280 to create the vacuum at inlet 210, drawing a vacuum within the receiver 224, which is positioned to receive contaminated water from the sea. Specifically, as pressurized water is supplied to supply 250, water is jetted in direction 290 such that contaminated water is drawn through inlets 230 in directions 286 into receiver 224. This vacuum causes water to flow through receiver 224 from 288, to outlet 282 at the inlet 210 of eductor 202. The system of the present invention may string several groups of basic components 202 and 224 together to make a boom of considerable length.

Referring to FIG. 5, a side cross-sectional view of the eductor of the oil recovery boom 202 of the present invention, taken along line 5-5 of FIG. 4 is shown. Eductor 202 is formed with an inlet 210 and an outlet 208, and defines an internal chamber 292 extending the length of the eductor. A fluid channel 293 provides for the flow of high pressure fluid 294 (shown in dashed lines), to flow through jacket 280 to an array of jets 296 positioned to direct the high pressure water towards chamber 292 in direction 290. The placement of the water jets 296 within the central chamber 292 of the eductor 202 create a vacuum at the inlet side 210 of the eductor 202 to draw water in direction 288 into and through the eductor 202.

The eductor utilized in a preferred embodiment of the present invention is a perijet eductor. As described above, the perijet eductor provides for a robust and durable water jet capable of drawing large vacuums at inlet 210. It is to be appreciated, however, that other eductor types may be used without departing from the present invention.

Referring to FIG. 6, a longitudinal cross-sectional drawing taken along line 6-6 of FIG. 4 is shown. From this view, the perimeter position of each jet 296 is shown. This preferred embodiment includes a four (4) jet eductor; other numbers of jets may be incorporated without departing from the present invention. Specifically, a perijet eductor may be formed with any symmetrically positioned jet configuration to jet water to chamber 292, and provides sufficient draw to create a vacuum at inlet 210.

Figure 7:
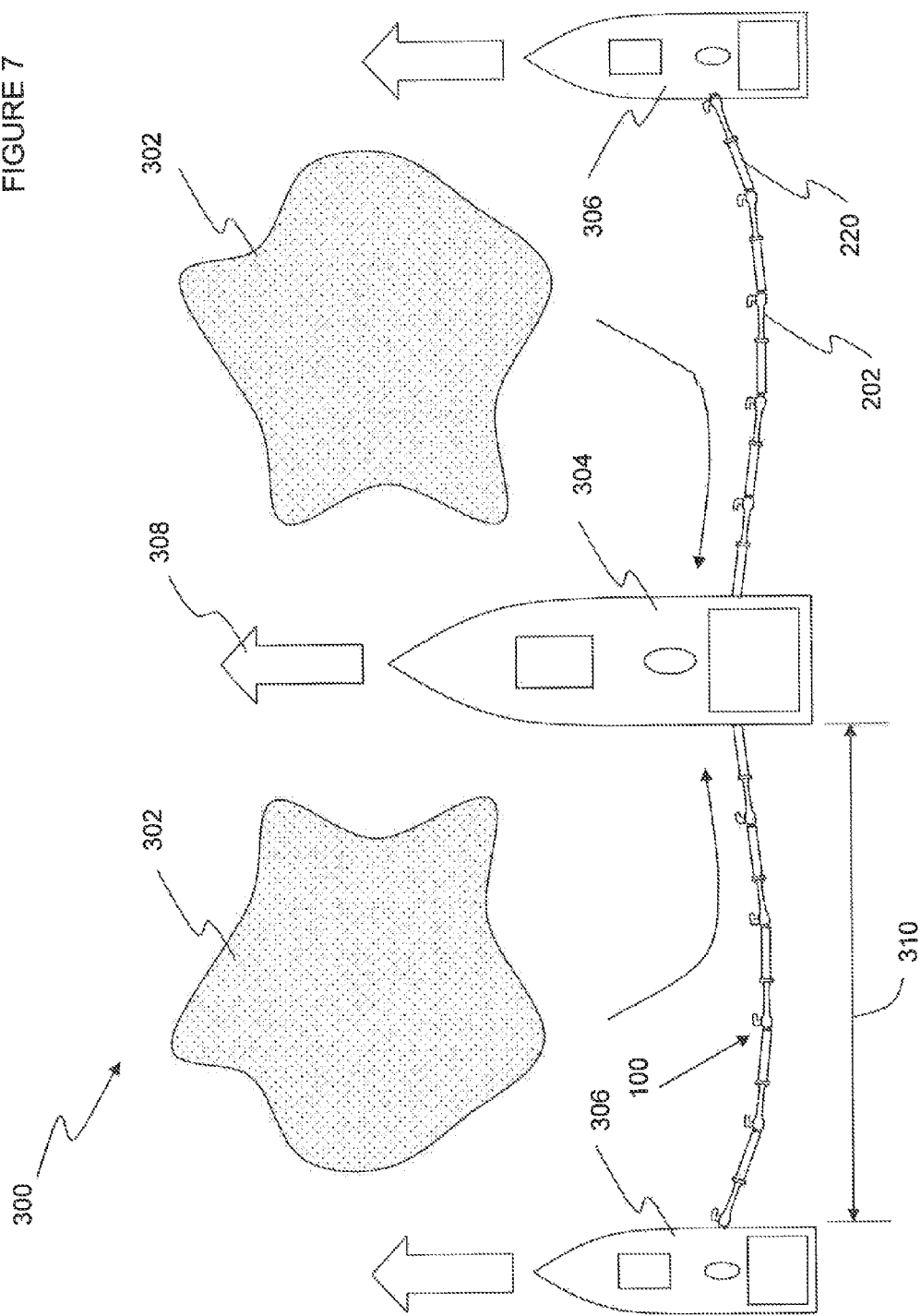
FIG. 7 is a drawing depicting the implementation of the oil recovery boom of the present invention showing a primary ocean-going vessel equipped with the water filtration system and receiving an oil recovery boom from each side which is advanced along the surface of the sea by companion vessels to extract oil-contaminated water from the sea.

FIG. 7 depicts the implementation of the oil recovery boom 100 of the present invention. In a typical use, oil 302 is floating on or near the surface of the ocean. A primary ocean-going vessel 304 equipped with the water filtration system and receiving an oil recovery boom 100 from each side which is advanced along the surface of the sea in direction 308 by companion vessels 306 to extract oil-contaminated water from the sea. Companion vessels 306 may be separated a distance 310 from primary vessel 304 by nearly any distance for which boom 100 can operate. For instance, for localized contamination, distance 310 may be less than a hundred feet, but for more dispersed contamination, distance 310 may be hundreds of yards. As the vessels 304 and 306 advance along the sea, oil 302 enters boom 100. Eductors 202 draw the contaminated water into the boom and to primary vessel 304 where the contamination is removed from the seawater.

FIG. 8 depicts another configuration in which the system of the present invention may be used. For instance, vessel 304, which might include an oil separator, can make a continuous loop with boom 100 to surround oil 302. Using this approach, a circular boom may be utilized to contain and remove a localized contaminate.

Referring to FIG. 9, a detailed schematic drawing of an alternative embodiment of the oil recovery boom of the presentation is depicted and generally designated 400. This embodiment is distinguished from the embodiment shown in FIG. 3, where an array of eductors is connected in series. In an alternative embodiment depicted in FIG. 9, an array of eductors 402, 404, 406, 408, 410 and 412 is connected in parallel, to form an elongated boom. Each eductor has an inlet 416 and an outlet 414. Connecting tubes 420, 422, 424, 426, 428 and 430 are attached to eductors 402, 404, 406, 408, 410 and 412, respectively. As shown, connecting tube 420 is formed with a longitudinal array of slits 432 which allow seawater to enter into the connecting tube from an area of normal pressure, to a vacuum area creating a lower pressure region within the boom. What is to be appreciated is that the specific shape and form of the connecting tubes is not limiting on the system of the present invention, and what has been shown is merely one of the examples of preferred embodiments of the present invention.

In use, a water source, such as seawater 440 is connected to inlet 442 leads to a high pressure pump 444. Pump 444 creates a high pressure water supply that is provided to manifold 446, which is distributed through a long horizontal supply line 448 and divisional supply lines 450, 452, 454, 456, 458 and 460 to eductors 402, 404, 406, 408, 410 and 412, respectively. In operation, the high pressure water provided through supply lines 448, 450, 452, 454, 456, 458 and 460 creates a vacuum at the inlet 416 of each eductor which in turn creates a vacuum at adjacent connecting tubes 420, 422, 424, 426, 428 and 430 such that fluids are drawn into inlets 470, 472, 474, 476, 478 and 480, pulling the contaminated water with it.

Once within the eductor, the contaminated fluids are advanced in direction 462 which separates oil 466 from seawater 468. The oil 466 is collected, and the now-cleaned seawater 468 is returned to the sea.

As shown in FIG. 9, six eductors 402, 404, 406, 408, 410 and 412 have been included to discuss the overall operation of the system of an alternative embodiment of the present invention. It is to be appreciated, however, that the number of eductors may range from one to many, depending on the length of the boom, the pressure provided by pump 444, and the size and number of inlets 470, 472, 474, 476, 478 and 480.

While there have been shown what are presently considered to be preferred embodiments of the present invention, it will be apparent to those skilled in the art that various changes and modifications can be made herein without departing from the scope and spirit of the invention.

What is claimed is:

1. An oil recovery boom comprising:
   a plurality of eductors, each eductor having an eductor inlet, an eductor outlet, and an eductor jacket, said eductors arranged in a series configuration where the educator outlet faces the eductor inlet of an adjacent educator to form a linear arrangement of eductors having a first end and a second end, a first educator at said first end and a last educator at said second end;
   a plurality of connecting tubes having a connecting tube inlet, a connecting tube outlet, and a plurality of connecting tube ports between said connecting tube inlet and said connecting tube outlet, each said connecting tube inlet is in fluid communication with an eductor outlet of an eductor and said connecting tube outlet is in fluid communication to an eductor inlet of an adjacent eductor;
   a flexible manifold having an open first end, a closed second end, and a plurality of supply line exits between said first end and said second end;
   a pump having a pump inlet and a pump outlet, said pump outlet attached and in fluid communication with said open first end of said high pressure flexible manifold and said pump inlet in fluid communication with a fluid to provide a flow of pressurized fluid to said flexible manifold;
   a plurality of supply lines having a supply line inlet and a supply line outlet, each said supply line inlet in fluid communication with each said supply line exit of said manifold and each said supply line outlet in fluid communication with said eductor jacket of each said eductor to provide pressurized water to said eductor;
   a separation filter receiving said outlet of said last educator and configured to separate fluid from contaminates.

2. The oil recovery boom of claim 1, wherein said eductor is a perijet eductor further comprising an internal chamber and a plurality of symmetrically positioned jets in fluid communication with said eductor jacket and configured to jet water into said internal chamber to provide sufficient draw to create a vacuum at said eductor inlet.

3. The oil recovery boom of claim 2, wherein said plurality of eductors, said plurality of connecting tubes, said flexible manifold, and plurality of supply lines is configured to float on the surface of a contaminated fluid and maintains the placement of the eductors to extract surface fluids from said contaminated fluid.

4. The oil recovery of boom of claim 3, wherein said plurality of ports of each of said connecting tubes is formed as a longitudinal array of slits to allow said contaminated fluid to enter into said connecting tube and into said eductor to be transferred into said separation filter.

5. The oil recovery boom of claim 3, wherein said plurality of ports of each of said connecting tubes is formed as a number of inlet holes to allow said contaminated fluid to enter into said connecting tube and into said eductor to be transferred into said separation filter.

6. The oil recovery boom of claim 3, wherein said plurality of ports of each of said connecting tubes is formed as a number of inlet tubes protruding normal from the surface of said connecting tube to allow said contaminated fluid to enter into said connecting tube and into said eductor to be transferred into said separation filter.

7. The oil recovery boom of claim 1 further comprising a floating vessel wherein said pump and separation filter is housed on said vessel and said plurality of eductors, said plurality of connecting tubes, said flexible manifold forms a loop.

8. The oil recovery boom of claim 1 further comprising a plurality of floating vessels wherein said pump is housed on a vessel and separation filter is housed on a subsequent floating vessel, wherein said plurality of eductors, said plurality of connecting tubes, and said flexible manifold forms a floating barrier between said floating vessel housing said pump and said subsequent floating vessel housing said separation filter.

9. An oil recovery boom comprising:
   an outlet manifold having a closed first end, an open second end, and a plurality of inlet ports between said closed first end and said open second end;
   a plurality of eductors, each eductor having an eductor inlet, an eductor outlet, and an eductor jacket, said eductors arranged in a parallel configuration with each of said educator outlet attached to and in fluid communication with said an inlet port of said outlet manifold;
   a plurality of connecting tubes having a connecting tube outlet and a plurality of connecting tube inlet ports, each of said connecting tube outlet attached and in fluid communication to each of said educator inlet and said plurality of inlet ports of said connecting tube is in fluid communication with a contaminated fluid source;
   a high pressure manifold having an open first end, a closed second end, and a plurality of supply line exits between said open first end and said closed second end;
   a high pressure pump having a pump inlet and a pump outlet, said pump outlet in fluid communication with said open first end of said high pressure manifold and said pump inlet in fluid communication with said contaminated fluid source to provide a flow of pressurized fluid to said high pressure manifold;
   a plurality of supply lines having a supply line inlet and a supply line outlet, each of said supply line inlets n fluid communication with said supply line exits and said supply line outlet attached to and in fluid communication with said eductor jacket to provide said flow of pressurized fluid to said eductor;
   a separation filter having an inlet, a water outlet, and a contaminate outlet, said separation filter inlet attached to and in fluid communication with said open second end of said outlet manifold and configured to separate water from contaminates; and
   wherein said high pressure pump provides said pressurized fluid to said plurality of eductors, thereby creating a vacuum in said eductor and attached connecting tubes to draw in contaminated water which is then transferred into said separation filter through said outlet manifold to filter the contaminated fluid into the fluid and contaminates.

10. The oil recovery boom of claim 9, wherein said plurality of eductors, said plurality of connecting tubes, said high pressure manifold, said outlet manifold, and plurality of supply lines is configured to float on the surface of said contaminated fluid and maintains the placement of the eductors to extract surface fluids from said contaminated fluid.

11. The oil recovery boom of claim 10, wherein said plurality of connecting tube inlet ports of each of said plurality of connecting tubes is formed with a longitudinal array of slits to allow said contaminated fluid to enter into said suction tube and into said eductor to be transferred into said separation filter.

12. The oil recovery boom of claim 11, wherein said plurality of connecting tube inlet ports of each of said plurality of connecting tubes is formed as a number of inlet holes to allow said contaminated fluid to enter into said suction tube and into said eductor to be transferred into said separation filter.

13. The oil recovery boom of claim 12, wherein said plurality of connecting tube inlet ports of each of said plurality of connecting tubes is formed as a number of inlet tubes protruding normal from the surface of said connecting tube to allow said contaminated fluid to enter into said suction tube and into said eductor to be transferred into said separation filter.

14. An oil recovery boom comprising:
a plurality of eductors, each eductor comprising an eductor inlet, an eductor outlet, and an eductor suction port;
an inner eductor boom having a first end and a second end, said inner eductor boom housing said plurality of eductors in fluid communication with each said eductor;
an outer eductor boom having a first end and a second end, said outer eductor boom affixed to and surrounding said inner eductor boom;
a high pressure pump connected to said first end of said inner eductor boom and in fluid communication with said inner eductor boom;
a discharge hose having a first and second end, said first end of discharge hose connected to said second end of inner eductor boom and in fluid communication with said inner eductor boom; and
wherein said high pressure pump provides a pressurized fluid flow through said inner eductor boom and plurality of eductors, thereby creating suction at said eductor suction port of each said eductor to draw in contaminated fluid.

15. The oil recovery boom of claim 14, wherein said inner eductor boom further comprises a hose constructed of flexible material and a plurality of inner eductor boom port holes and said outer eductor boom further comprises a hose constructed of flexible material and a plurality of outer eductor boom port holes, each of said outer eductor boom port hole corresponding to said inner eductor boom port hole.

16. The oil recovery boom of claim 15, wherein said plurality of eductors are arranged in a sequential configuration with the inlet of an eductor facing the outlet of a subsequent eductor and said eductor suction ports penetrating through said inner eductor boom port hole and said corresponding outer eductor boom port hole.

17. The oil recovery boom of claim 16, wherein said suction port of said eductors is in fluid communication with said contaminated fluid.

18. The oil recovery boom of claim 17, wherein said second end of said discharge hose is fluidly connected to an oil separation container.

19. The oil recovery boom of claim 18, wherein said discharge hose is connected to said second end of said inner eductor boom by a hose connector and said high pressure pump is connected to said first end of said inner boom by a hose connector.

20. The oil recovery boom of claim 19, wherein said inner eductor boom and said outer eductor boom maintains said eductor suction ports of said eductors at the surface of said contaminated fluid to extract surface fluids from said contaminated fluid.

\* \* \* \* \*